US007772300B2

(12) United States Patent
Schinabeck et al.

(10) Patent No.: US 7,772,300 B2
(45) Date of Patent: *Aug. 10, 2010

(54) POLYMER COMPOSITION AND USE OF THE SAME AS AN ADDITIVE IN AQUEOUS CONSTRUCTION SYSTEMS AND WATER-BASED PAINT AND COATING SYSTEMS

(75) Inventors: Michael Schinabeck, Garching (DE); Stefan Friedrich, Garching (DE); Uwe Holland, Wehringen (DE); Peter Gäberlein, Augsburg (DE); Manfred Schuhbeck, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 274 days.

This patent is subject to a terminal disclaimer.

(21) Appl. No.: 10/598,901

(22) PCT Filed: Mar. 16, 2005

(86) PCT No.: PCT/EP2005/002799

§ 371 (c)(1),
(2), (4) Date: Mar. 13, 2008

(87) PCT Pub. No.: WO2005/090424

PCT Pub. Date: Sep. 29, 2005

(65) Prior Publication Data

US 2009/0186964 A1 Jul. 23, 2009

(30) Foreign Application Priority Data

Mar. 17, 2004 (DE) .................. 10 2004 031 158

(51) Int. Cl.
| | |
|---|---|
| C08B 11/193 | (2006.01) |
| C08L 1/26 | (2006.01) |
| C08L 81/00 | (2006.01) |
| A61K 9/50 | (2006.01) |
| C08K 3/10 | (2006.01) |
| C08F 12/30 | (2006.01) |
| C08F 28/02 | (2006.01) |
| C08F 128/02 | (2006.01) |
| C08F 228/02 | (2006.01) |
| C08F 126/02 | (2006.01) |
| C08F 20/42 | (2006.01) |
| C08F 20/70 | (2006.01) |
| C08F 22/30 | (2006.01) |
| C08F 120/42 | (2006.01) |
| C08F 122/30 | (2006.01) |
| C08G 75/00 | (2006.01) |

(52) U.S. Cl. .................. 524/44; 526/286; 526/287; 526/288; 526/297; 526/264; 524/42; 524/43; 524/808; 524/817; 525/535

(58) Field of Classification Search ............... 526/288, 526/264, 297, 286, 287; 524/808, 817, 35, 524/42, 43, 44; 525/535
See application file for complete search history.

(56) References Cited

U.S. PATENT DOCUMENTS

| 6,187,887 | B1 | 2/2001 | Albrecht et al. | |
|---|---|---|---|---|
| 7,238,760 | B2 * | 7/2007 | Schinabeck et al. | 526/288 |
| 2001/0033941 | A1 * | 10/2001 | Kiesewetter et al. | 428/533 |
| 2004/0024154 | A1 * | 2/2004 | Schinabeck et al. | 526/287 |

FOREIGN PATENT DOCUMENTS

| DE | 19806482 A1 | 8/1999 |
|---|---|---|
| DE | 10037629 A1 | 2/2002 |
| WO | WO-0210229 A1 * | 2/2002 |
| WO | 02/083743 A1 | 10/2002 |

* cited by examiner

Primary Examiner—Vasu Jagannathan
Assistant Examiner—Anthony H Sheh
(74) Attorney, Agent, or Firm—Fitch, Even, Tabin & Flannery

(57) ABSTRACT

A polymeric composition consisting of water-soluble or water-swellable copolymers containing sulfo groups and nonionic polysaccharide derivatives, such as methylcellulose (MC), hydroxyethylcellulose (HEC), hydroxypropylcellulose (HPC), methylhydroxyethylcellulose (MHEC), methylhydroxypropylcellulose (MHPC) and welan gum or diutan gum, and the use thereof as an additive in aqueous construction systems based on hydraulic binders, such as cement, lime, gypsum or anhydrite, is described. The composition can also be used in water-based paint and coating systems. The composition according to the invention exhibits a synergistic improvement of the properties and, when used in relatively small amounts, constitutes highly effective water retention agents in such construction and paint systems, which also achieve outstanding air pore stability and tack.

11 Claims, No Drawings

POLYMER COMPOSITION AND USE OF THE SAME AS AN ADDITIVE IN AQUEOUS CONSTRUCTION SYSTEMS AND WATER-BASED PAINT AND COATING SYSTEMS

The present invention relates to a polymeric composition consisting of water-soluble or water-swellable associatively thickening copolymers containing sulfo groups, in combination with nonionic polysaccharide derivatives, and the use thereof as an additive in aqueous construction systems based on hydraulic binders, such as cement, lime, gypsum, anhydrite, etc., and in water-based paint and coating systems.

Water-soluble nonionic derivatives of polysaccharides, in particular cellulose and starch derivatives, are usually used in aqueous construction material mixtures in order to delay or to prevent the undesired evaporation of water which is required for hydration and processibility or the flowing away thereof into the substrate.

Because they control the key function of water retention in paint systems, renders, adhesive mortars, filling compounds and joint fillers, but also in air-placed concretes for tunnel construction and in underwater concretes, such additives have a decisive influence on the consistency (plasticity), open time, smoothability, segregation, tack, adhesion (to the substrate and to the tool), stability and resistance to slipping and adhesive tensile strength and compressive strength or shrinkage.

According to Ullmann's Enzyklopädie der Technischen Chemie [Ullmann's Encyclopedia of Industrial Chemistry] (4th edition, volume 9, pages 208-210, Verlag Chemie Weinheim), the most commonly used water retention agents are synthetically produced nonionic cellulose and starch derivatives, such as methylcellulose (MC), hydroxyethylcellulose (HEC), methylhydroxyethylcellulose (MHEC), methylhydroxypropylcellulose (MHPC). However, microbially produced polysaccharides, such as welan gum and diutan gum, and naturally occurring polysaccharides (hydrocolloids) isolated by extraction, such as alginates, xanthans, carrageenans, galactomannans, etc., are used according to the prior art for regulating the water balance and the rheology of aqueous construction and paint systems.

According to U.S. Pat. No. 5,863,975 and DE 198 06 482 A1, synthetic polymers which have water retention properties and contain copolymers containing carboxyl groups or containing sulfo groups are described.

In comparison with products containing carboxyl groups, sulfoalkylated cellulose derivatives, which are described, inter alia, in EP 554 749 A2, as well as the polyelectrolytes according to DE 198 06 482 A1 which contain sulfo groups, have excellent compatibility with polyvalent cations, such as, for example, calcium, magnesium or aluminum.

According to WO 02/10 229 A1, very high molecular weight water-soluble or water-swellable associatively thickening copolymers containing sulfo groups are disclosed, which copolymers, in contrast to the above polyelectrolytes, show no decrease in viscosity even in the presence of high salt concentrations.

The water-swellable copolymers which contain sulfo groups and are disclosed in DE 198 06 482 A1 or WO 02/10 229 A1 have the disadvantage that they do not have the required tack especially in tile adhesives but also in renders. Thus, the tile adhesive does not adhere sufficiently to the trowel and cannot be easily picked up again with the notched trowel. In both applications, but especially in render applications, the stability of the air pores alone constitutes a problem. The air often introduced with air pore formers bursts out substantially after about 10 to 20 minutes.

Cellulose ethers, which do not have the above disadvantage often have on the other hand excessively high tacks in render application, which can be alleviated only by addition of formulation components. In addition, the excessively high tack limits the amount of cellulose ethers used and hence also the water retention which can be set, since the render or tile adhesive is no longer processible at doses which are too high.

In stable tile adhesives, cellulose ethers have to be mixed with formulation components, such as starch ethers and polyacrylamides (formulated cellulose ethers as described, for example, in the publications DE 12 83 726 A1 and DE 39 13 518 A1), in order for the required stability to be achieved.

It was therefore the object of the present invention to improve the poor tack of the synthetic polymers and the poor air pore stability by formulation and moreover to impart to the construction and paint systems excellent performance characteristics during processing and in the hardened or dried state. An important aim furthermore was to achieve an increase in the water retention properties without troublesome tack or unpleasant thickening.

This object was achieved, according to the invention, by the combination of copolymers containing sulfo groups with nonionic polysaccharide derivatives according to claim 1.

It has in fact surprisingly been found that the combination, according to the invention, of the copolymers containing sulfo groups with nonionic polysaccharide derivatives, such as methylcellulose (MC), hydroxyethylcellulose (HEC), hydroxypropylcellulose (HPC), methylhydroxyethylcellulose (MHEC), methylhydroxypropylcellulose (MHPC) and welan gum or diutan gum, has unexpected synergistic effects. Thus, by means of the composition comprising the polysaccharide derivatives, inter alia a considerable improvements of the water retention capacity, the air pore stability and the tack in aqueous construction systems based on hydraulic binders, such as cement, lime, gypsum, anhydrite, etc., and in water-based paint and coating systems is achieved which was by no means foreseeable.

The copolymers containing sulfo groups and corresponding to the present invention which are used consist of at least four components a), b), c) and d). The first component a) is a substituted acrylic or methacrylic derivative of the formula (I) which contains sulfo groups:

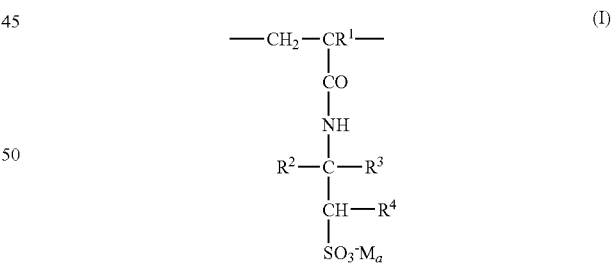

where
$R^1$=hydrogen or methyl,
$R^2$, $R^3$, $R^4$=hydrogen, aliphatic hydrocarbon radical having 1 to 6 C atoms, phenyl radical optionally substituted by methyl groups and
M=hydrogen, monovalent or divalent metal cation, ammonium or an organic amine radical and
$a=\frac{1}{2}$ or 1.

Sodium, potassium, calcium or magnesium ions are preferably used as the monovalent or divalent metal cation. Substituted ammonium groups which are derived from primary, secondary or tertiary $C_1$- to $C_{20}$-alkylamines, $C_1$- to $C_{20}$-alkanolamines, $C_5$- to $C_8$-cycloalkylamines and $C_6$- to $C_{14}$-arylamines are preferably used as organic amine radicals. Examples of corresponding amines are methylamine, dimethylamine, trimethylamine, ethanolamine, diethanolamine, triethanolamine, cyclohexylamine, dicyclohexylamine, phenylamine and diphenylamine in the protonated ammonium form. a is 1 for hydrogen, monovalent metal cations, ammonium and organic amine radicals. For divalent metal cations, a is ½.

The component a) is preferably derived from monomers, such as 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid. 2-Acrylamido-2-methylpropanesulfonic acid is particularly preferred.

The second component b) corresponds to the formulae (IIa) and/or (IIb):

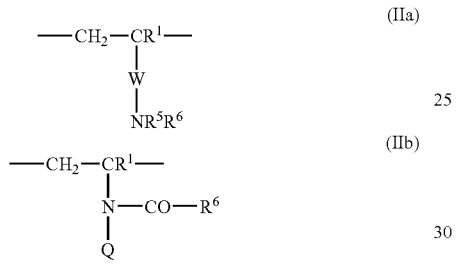

in which
$W = —CO—, —CO—O—(CH_2)_x—, —CO—NR^2—(CH_2)_x—,$
x is from 1 to 6 and
$R^1$ and $R^2$ have the abovementioned meaning.
$R^5$ and $R^6$, independently of one another, are hydrogen, an aliphatic hydrocarbon radical having 1 to 20 C atoms, a cycloaliphatic hydrocarbon radical having 5 to 8 C atoms or an aryl radical having 6 to 14 C atoms. These radicals may be optionally substituted by hydroxyl, carboxyl or sulfo groups.
Q in formula IIb) is hydrogen or $—CHR^5R^7$. In the case of $Q \neq H$, $R^5$ and $R^6$ in the structure (IIb) can moreover together be a $—CH_2—(CH_2)_y$-methylene group with y=1 to 4, which, with inclusion of the radical of the formula (IIb)

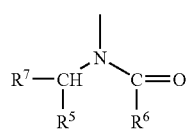

form a five- to eight-membered heterocyclic ring.
$R^7$ may be a hydrogen atom, a $C_1$- to $C_4$-alkyl radical, a carboxyl group or a carboxylate group $—COOM_a$,
M and a having the abovementioned meaning.

Suitable monomers which form the structure (IIa) are preferably the following compounds: acrylamide, methacrylamide, N-methylacrylamide, N,N-dimethylacrylamide, N-ethylacrylamide, N-cyclohexylacrylamide, N-benzylacrylamide, N-methylolacrylamide, N-tert-butylacrylamide, etc. Examples of monomers as a basis for the structure (IIb) are N-methyl-N-vinylformamide, N-methyl-N-vinylacetamide, N-vinylpyrrolidone, N-vinylcaprolactam, N-vinylpyrrolidone-5-carboxylic acid, etc.

The third component c) corresponds to the formulae (IIIa) and/or (IIIb)

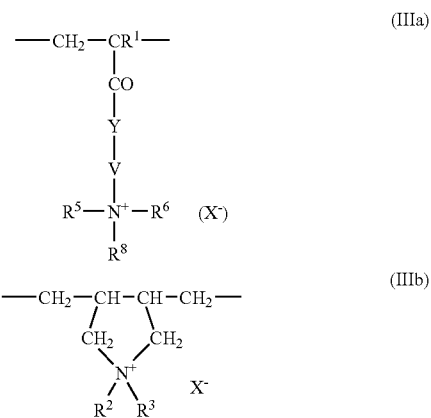

in which
$Y = O$, NH or $NR^5$,
$V = —(CH_2)_x—$,

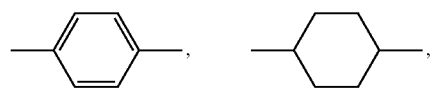

$R^8 = R^5$ or $R^6$,

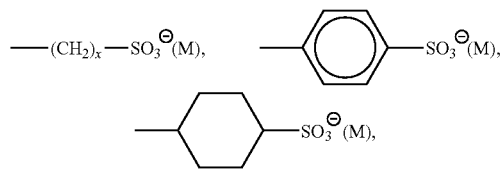

X=halogen (preferably Cl, Br), $C_1$- to $C_4$-alkylsulfate (preferably methylsulfate) or $C_1$- to $C_4$-alkanesulfonate and
$R^1, R^2, R^3, R^5, R^6$, M and x have the abovementioned meaning.

Suitable monomers which form the structure (IIIa) are preferably the following compounds: [2-(acryloyloxy)ethyl]trimethylammonium chloride, [2-(acryloylamino)ethyl]trimethylammonium chloride, [2-(acryloyloxy)ethyl]trimethylammonium methosulfate, [2-(methacryloyloxy)ethyl]trimethylammonium chloride or methosulfate, [3-(methacryloylamino)propyl]trimethylammonium chloride, N-(3-sulfopropyl)-N-methacryloyloxyethyl-N'-N-dimethylammonium betaine, N-(3-sulfopropyl)-N-methacrylamidopropyl-N, N-dimethylammonium betaine and 1-(3-sulfopropyl)-2-vinylpyridinium betaine.

Examples of monomers as a basis for the structure (IIIb) are N,N-dimethyldiallylammonium chloride and N,N-diethyldiallylammonium chloride.

The fourth component d) corresponds to the formula (IV)

in which
Z=—COO($C_mH_{2m}O)_n$—$R^9$, —$(CH_2)_p$—O$(C_mH_{2m}O)_n$—$R^9$,
$R^9$=H, $C_1$-$C_4$-alkyl,

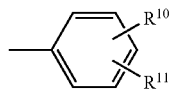

and unsaturated or saturated, linear or branched aliphatic alkyl radical having 20 to 40 C atoms,
$R^{10}$=H, $C_1$-$C_4$-alkyl, phenyl, benzyl, $C_1$-$C_4$-alkoxy, halogen (F, Cl, Br, I), cyano, —COOH, —$COOR^5$, —CO—$NH_2$, —$OCOR^5$,
$R^{11}$=arylalkyl group having $C_1$-$C_{12}$-alkyl and $C_6$-$C_{14}$-aryl radical,
m=from 2 to 4,
n=from 0 to 200,
p=from 0 to 20, and
$R^1$ and $R^5$ have the abovementioned meaning.

Preferred monomers which form the structure (IV) are methylpolyethylene glycol-750 methacrylate, polyethylene glycol-500 methacrylate, allylpolyethylene glycol-350, methylpolyethylene glycol-2000 monovinyl ether, phenyltriethylene glycol acrylate, hydroxyethyl acrylate, hydroxypropyl acrylate, hydroxypropyl methacrylate, polyethylene glycol-500 vinyloxybutyl ether, methylpolyethylene glycol-block-propylene glycol allyl ether, tristyrylpolyethylene glycol-1100 methacrylate, behenylpolyethyleneglycol-1100 methacrylate, tristyrylpolyethylene glycol-1100 acrylate, tristyrylpolyethene glycol-1100 monovinyl ether, behenylpolyethene glycol-1100 monovinyl ether, phenyltriethylene glycol acrylate, tristyrylpolyethylene glycol-1100 vinyloxybutyl ether, behenylpolyethylene glycol-1100 vinyloxybutyl ether, tristyrylpolyethene glycol-block-propylene glycol allyl ether, behenylpolyethylene glycol-block-propylene glycol allyl ether, etc.

It is to be regarded as essential for the invention that the copolymers consist of from 3 to 96 mol % of the component a), from 3 to 96 mol % of the component b), from 0.05 to 75 mol % of the component c) and from 0.01 to 30 mol % of the component d). Preferably used polymers contain from 15 to 90 mol % of a), from 5 to 80 mol % of b), from 0.25 to 50 mol % of c) and from 0.05 to 20 mol % of d). More preferably used polymers contain from 40 to 80 mol % of a), from 15 to 55 mol % of b), from 2 to 30 mol % of c) and from 0.1 to 10 mol % of d).

The number of repeating structural elements in the copolymers according to the invention is not limited and depends to a very great extent on the respective field of use. However, it has proven advantageous to establish the number of structural units so that the copolymers have a number average molecular weight of from 50 000 to 10 000 000.

The preparation of the copolymers is effected in a manner known per se by linkage of the monomers forming the structures a) to d) by free radical, ionic or complex coordinative mass, solution, gel, emulsion, dispersion or suspension polymerization.

These copolymers are already known and are described in WO 02/10 229 A1 and DE 198 06 482 A1.

Cellulose ethers, such as methylcellulose (MC), hydroxyethylcellulose (HEC), hydroxypropylcellulose (HPC), methylhydroxyethylcellulose (MHEC), methylhydroxypropylcellulose (MHPC) having different chain lengths and degrees of substitution (DS), but also welan gum or diutan gum, can be used as nonionic polysaccharide derivatives. The preferred degrees of substitution for cellulose ethers in the context of the present invention are from 0.5 to 5, more preferably from 1.0 to 2.5, for the methyl group and from 0.1 to 5, more preferably from 0.1 to 1, for the hydroxyethyl or hydroxypropyl group, depending on cellulose ether types. The average degree of substitution is from 1.0 to 2.8. The chain lengths of the cellulose ethers are specified as viscosities of the 2% strength solution and are from 100 to 100 000, preferably from 1000 to 80 000, mPa·s (measured using an RVT Brookfield viscometer).

The polymeric composition according to the invention consists of the copolymers and cellulose derivatives described in the ratio of from 1:5 to 10:1. Mixtures in the ratio of from 1:2 to 7:1 are preferred. Mixtures in the ratio of from 1:1 to 5:1 are particularly preferred.

If this composition according to the invention is used as an additive in aqueous construction systems based on hydraulic binders, such as cement, lime, gypsum or anhydrite, in a fixed dose, better properties are achieved than when both individual components are used in the same total dose, i.e. a synergistic increase in activity is present.

Thus, a considerable improvements of the water retention capacity, the air pore stability and the tack is achieved with the compositions according to the invention.

At high doses of cellulose ethers (0.5% by weight) an unpleasant tack and a poor, excessively stiff processing consistency occur in the case of high molecular weight cellulose ethers. Through the choice of low-viscosity copolymers containing sulfo groups and having low tack but very good water retention, it is possible, for example, to formulate a tile adhesive (total content of water retention agent from about 0.7 to 1% by weight) which permits substantially better water retention properties and hence longer correction times of the laid tiles. In spite of the high dose of water retention agents, the adhesive has very good processing properties (soft, creamy consistency in combination with tack which is not too high).

An unexpected improvement of the properties by the composition according to the invention is achieved even on use in water-based paint and coating systems.

The preferred amounts of the composition according to the invention which are used are from 0.01 to 10% by weight, preferably from 0.01 to 5% by weight, based on the dry weight of the construction, paint or coating system, depending on the method of use.

The polymeric composition according to the invention has excellent water-retaining properties and imparts, inter alia, outstanding performance characteristics, both in the processing state and in the hardened or dried state, to pigment-containing paints, renders, adhesive mortars, filling compounds, joint fillers, air-placed concrete, underwater concrete, mineral oil drilling cements. The composition is furthermore distinguished by the fact that outstanding air pore stability and tack are obtained with it in the construction material mixtures and this can be established in a targeted manner by the ratios and choice of the synthetic polymers.

The following examples are intended to explain the invention in more detail.

EXAMPLES

The copolymers containing sulfo groups were prepared according to WO 02/10 229 A1 and DE 198 06 482 A1 by gel polymerization. The composition of the selected copolymers is summarized in table 1.

TABLE 1

| Monomer component | a) | b) | c) | d) |
|---|---|---|---|---|
| Copolymer 1 [1] | 2-acrylamido-2-methylpropanesulfonic acid, Na salt | acrylamide | [2-(methacrylamido)propyl]trimethylammonium chloride | tristyrylphenolpolyethylene glycol-1100 methacrylate |
| | 47.1 mol % | 49.1 mol % | 3.1 mol % | 0.7 mol % |
| Copolymer 2 [1] | 2-acrylamido-2-methylpropanesulfonic acid, Na salt | N,N-dimethylaminopropylacrylamide | [2-(methacrylamido)propyl]trimethylammonium chloride | tristyrylphenolpolyethylene glycol-1100 methacrylate |
| | 71.7 mol % | 22.5 mol % | 4.8 mol % | 1.0 mol % |
| Copolymer 3 [1] | 2-acrylamido-2-methylpropanesulfonic acid, Na salt | N,N-dimethylacrylamide | N,N-dimethyldiallylammonium chloride | behenylethylene glycol-1100 methacrylate |
| | 26.8 mol % | 13.4 mol % | 59.77 mol % | 0.03 mol % |
| Copolymer 4 [2] | 2-acrylamido-2-methylpropanesulfonic acid, Na salt | N,N-dimethylacrylamide | [2-(methacrylamido(propyl]trimethylammonium chloride | polyethylene glycol-500 vinyloxybutyl ether |
| | 66.9 mol % | 28.1 mol % | 4.6 mol % | 0.4 mol % |
| Copolymer 5 [2] | 2-acrylamido-2-methylpropanesulfonic acid, Na salt | N,N-dimethylacrylamide | [2-(methacrylamido(propyl]trimethylammonium chloride | methylpolyethylene glycol-1100 methacrylate |
| | 72.3 mol % | 22.7 mol % | 4.8 mol % | 0.2 mol % |

[1] copolymer according to WO 02/10 229 A1
[2] copolymer according to DE 198 06 482 A1

Various commercially available cellulose ethers, which are listed in table 2, were used as nonionic polysaccharide derivatives.

TABLE 2

| No. | Cellulose derivative | Type | Solution viscosity |
|---|---|---|---|
| 1 | Tylose MB 10 000 P6 [1] | methylhydroxyethyl-cellulose (MHEC) | 10 000 mPa · s |
| 2 | Culminal MHPC 20 000 [2] | methylhydroxypropyl-cellulose (MHPC) | 20 000 mPa · s |

[1] Product from Clariant GmbH
[2] Product from Hercules, Inc.

The compositions according to the invention were prepared from the copolymers and the polysaccharide derivatives. The mixing ratios are summarized in table 3.

TABLE 3

| | Component 1 | Component 2 | Mixing ratio |
|---|---|---|---|
| Example 1 | copolymer 1 | cellulose ether 2 | 4:1 |
| Example 2 | copolymer 1 | cellulose ether 2 | 3:1 |
| Example 3 | copolymer 1 | cellulose ether 2 | 2:1 |
| Example 4 | copolymer 2 | cellulose ether 2 | 1:1 |
| Example 5 | copolymer 2 | cellulose ether 1 | 2:1 |
| Example 6 | copolymer 2 | cellulose ether 1 | 4:1 |
| Example 7 | copolymer 1 | cellulose ether 1 | 1:1 |
| Example 8 | copolymer 1 | cellulose ether 1 | 2:1 |
| Example 9 | copolymer 1 | cellulose ether 1 | 3:1 |
| Example 10 | copolymer 3 | cellulose ether 1 | 4:1 |
| Example 11 | copolymer 4 | cellulose ether 2 | 1:1 |
| Example 12 | copolymer 5 | cellulose ether 1 | 2:1 |
| Comparative example 1 | copolymer 1 | — | 1:0 |
| Comparative example 2 | copolymer 4 | — | 1:0 |
| Comparative example 3 | — | cellulose ether 1 | 0:1 |
| Comparative example 4 | — | cellulose ether 2 | 0:1 |
| Comparative example 5 | copolymer 5 | — | 1:0 |

Performance assessment of the compositions according to the invention and comparative examples was effected on the basis of a test mixture from the area of adhesive tile mortars.

For this purpose, a test was carried out under conditions close to those in practice with the use of a dry mixture which was formulated ready for use and with which the additives according to the invention or the comparative products were mixed in solid form. After the dry mixing, a certain amount of water was added and thoroughly stirred by means of a drill with a G3 mixer (duration 2·15 seconds). Thereafter, the stirred mixture ripened for 5 min and was then subjected to a first visual examination.

Determination of the Slump

The determination of the slump was effected after the ripening time and a second time 30 min after stirring (after stirring up briefly by hand) according to DIN 18555, part 2.

Determination of the Water Retention

The water retention was determined about 15 min after stirring according to DIN 18555, part 7.

Determination of the Air Pore Stability

The air pore stability was determined qualitatively by visual assessment.

Determination of the Tack

The tack was determined qualitatively by visual assessment.

Determination of the Wetting of the Tile

The tile adhesive formulation was applied to a fiber cement panel and a tile (5×5 cm) was placed on top after 10 minutes and was loaded with a weight of 2 kg for 30 seconds. After a further 60 minutes, the tile was removed and the percentage of the back of the tile to which adhesive still adhered was determined.

Determination of the Correctability of the Tile

The tile adhesive formulation was applied to a fiber cement panel and three tiles (5×5 cm) were placed on top after 5 minutes and were loaded with a weight of 2 kg for 30 seconds. After 5, 10 and 15 minutes in each case one tile was corrected. The force applied for moving the tile in the adhesive bed was assessed. The assessment scale includes very good correctability, good, moderate, poor, very poor correctability and correction no longer possible.

Determination of the Stability (Slip Test)

For the slip test, a tile (15×15 cm) was placed in the tile adhesive formulation, loaded with a 5 kg weight for 30 seconds and placed perpendicular to the test setup. Thereafter, the upper edge of the tile was loaded with a weight for 30 seconds in each case, and the weight at which the tile slips was determined.

The composition of the adhesive tile mortar is shown in table 4.

TABLE 4

Composition of the test mixture (in % by weight)

| Component | Amount |
|---|---|
| Portland cement [1] | 36.00 |
| Quartz sand (0.05-0.4 mm) | 57.84 |

TABLE 4-continued

Composition of the test mixture (in % by weight)

| Component | Amount |
|---|---|
| White pigment [2] | 5.50 |
| Cellulose fibers | 0.50 |
| Water retention agent | 0.16 |

[1] CEM II 42.5 R
[2] Ulmer white "Juraperle MHS"

The test results obtained with the compositions according to the invention and the comparative examples are shown in table 5.

TABLE 5

Processing properties of a tile mortar for ceramic tiles which was modified with compositions according to the invention and comparative examples corresponding to the prior art.

| Additive | Slump (cm) | Slump after 30 min (cm) | Water retention (%) | Tack | Wetting (%) | Slip (g) | Air pore stability |
|---|---|---|---|---|---|---|---|
| Example 1 | 14.9 | 15.0 | 99.2 | very good | 85 | 300 | very good |
| Example 2 | 14.5 | 14.3 | 99.0 | very good | 89 | 370 | very good |
| Example 3 | 14.1 | 14.0 | 99.0 | very good | 75 | 300 | very good |
| Example 4 | 14.2 | 14.3 | 98.0 | very good | 80 | 250 | very good |
| Example 5 | 15.0 | 15.1 | 99.0 | very good | 85 | 300 | very good |
| Example 6 | 14.9 | 15.0 | 98.7 | very good | 78 | 200 | very good |
| Example 7 | 15.0 | 15.2 | 98.5 | very good | 80 | 250 | very good |
| Example 8 | 14.7 | 14.8 | 98.9 | very good | 78 | 320 | very good |
| Example 9 | 14.2 | 14.3 | 98.8 | very good | 70 | 400 | very good |
| Example 10 | 15.1 | 15.3 | 99.1 | very good | 80 | 250 | very good |
| Example 11 | 14.8 | 14.5 | 98.5 | very good | 75 | 180 | very good |
| Comparative example 1 | 15.0 | 15.5 | 98.0 | good | 65 | 200 | good |
| Comparative example 2 | 14.8 | 14.5 | 97.5 | moderate | 60 | 100 | moderate |
| Comparative example 3 | 16.0 | 16.1 | 96.4 | very good | 80 | 50 | very good |
| Comparative example 4 | 15.4 | 15.2 | 97.0 | very good | 72 | 70 | very good |

Dose: 0.16% by weight
Amount of water: 260 g
Adhesive mortar: 1000 g

TABLE 6

Processing properties (including correctabilities) of an adhesive mortar for ceramic tiles which was modified with compositions according to the invention and comparative examples corresponding to the prior art.

| Additive | Slump (cm) | Slump after 30 min (cm) | Correctability after 5, 10 and 15 min | Tack | Wetting (%) | Slip (g) | Air pore stability |
|---|---|---|---|---|---|---|---|
| Example 12 | 14.3 | 14.2 | very good<br>very good<br>good | very good | 85 | 380 | very good |
| Comparative example 3 | —[1] | — | good<br>good<br>moderate | —[2] | 80 | 250 | very good |
| Comparative example 5 | 18.3 | 18.6 | very good<br>good<br>moderate | very good | 95 | slip | poor |

Dose: 1.0% by weight
Amount of water: 320 g
Adhesive mortar: 1000 g

[1] Owing to the high tack and chewing gum-like consistency, slump cannot be determined.
[2] The adhesive is unpleasantly stiff and can be applied only with very great difficulty. The processor would normally use more water, which would lead to loss of stability. Moreover, the properties of the hardened adhesive would be adversely affected by the additional water (change of water/cement ratio).

The test results in table 5 show that the compositions according to the invention (examples 1 to 11) give similar slumps to comparative examples 1 and 2. However, tack, wetting, slip, air pore stability and also the water retention values are substantially better than in the case of comparative examples 1 and 2. If the compositions according to the invention (examples 1 to 11) are compared with comparative examples 3 and 4, similar water retention values, tacks, wetting and air pore stability are found. However, the slumps are higher and the water retention values and the slip are substantially poorer in the case of comparative examples 3 and 4.

The synergism between the copolymers containing sulfo groups and the nonionic polysaccharide derivatives in the compositions according to the invention is evident from the fact that the processing properties are substantially better than the additive combination of the properties of the copolymers and nonionic polysaccharide derivatives. The soft creamy processing properties in combination with very good slip behavior are to be singled out in particular. This makes it possible to formulate tile adhesives which can be processed easily and with little force and nevertheless meet the requirements of an extremely stable adhesive.

The test results at higher dose (table 6) show that only the composition according to the invention (example 12) has very good processing properties. Comparative example 3 has excessively great tack or chewing gum-like consistency and comparative example 5 has slip. In the case of example 12, the outstanding correctability over time in combination with excellent consistency (slump, air pore stability and tack) and the very good stability are therefore to be singled out.

The compositions according to the invention are therefore substantially superior to the individual components used in the comparative examples (both the copolymers and the nonionic polysaccharide derivatives) and thus constitute a considerable improvement of the prior art.

The invention claimed is:

1. A polymeric composition containing
A) a water-soluble or water-swellable copolymer containing sulfo groups and comprising
   a) from 3 to 96 mol % of the formula (I)

$$\begin{array}{c}-CH_2-CR^1-\\ |\\ CO\\ |\\ NH\\ |\\ R^2-C-R^3\\ |\\ CH-R^4\\ |\\ SO_3^-M_a\end{array} \quad (I)$$

where
$R^1$=hydrogen or methyl,
$R^2$, $R^3$, $R^4$=hydrogen, aliphatic hydrocarbon radical having 1 to 6 C atoms, phenyl radical optionally substituted by methyl groups and
M=hydrogen, monovalent or divalent metal cation, ammonium or an organic amine radical and
a=½ or 1,
   b) from 3 to 96 mol % of the formula (IIa) and/or (IIb)

$$\begin{array}{c}-CH_2-CR^1-\\ |\\ W\\ |\\ NR^5R^6\end{array} \quad (IIa)$$

$$\begin{array}{c}-CH_2-CR^1-\\ |\\ N-CO-R^6\\ |\\ Q\end{array} \quad (IIb)$$

in which
W=—CO—, —CO—O—$(CH_2)_x$—, —CO—$NR^2$—$(CH_2)_x$—,
x=from 1 to 6,
$R^5$ and $R^6$=hydrogen, an optionally substituted aliphatic hydrocarbon radical having 1 to 20 C atoms, a cycloaliphatic hydrocarbon radical having 5 to 8 C atoms or an aryl radical having 6 to 14 C atoms and Q=hydrogen or —$CHR^5R^7$ and, in the case of Q≠H, $R^5$ and $R^6$ in (IIb) together form a —$CH_2$—$(CH_2)_y$—methylene group with y=from 1 to 4 and
$R^7$=hydrogen, an aliphatic hydrocarbon radical having 1 to 4 C atoms, —COO—$M_a$,
$R^1$, $R^2$, M and a having the abovementioned meaning,
   c) from 0.05 to 75 mol % of the components of the formula (IIIa) and/or (IIIb)

$$\begin{array}{c}-CH_2-CR^1-\\ |\\ CO\\ |\\ Y\\ |\\ V\\ |\\ R^5-N^+-R^6 \quad (X^-)\\ |\\ R^8\end{array} \quad (IIIa)$$

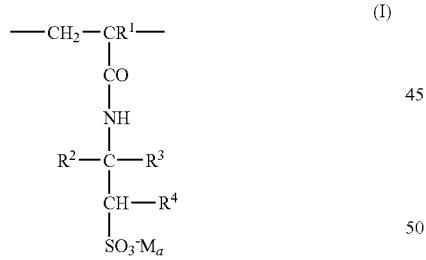

(IIIb)

in which
Y=O, NH or $NR^5$,
V=—$(CH_2)_x$—,

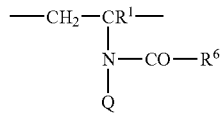

$R^8$=$R^5$ or $R^6$,

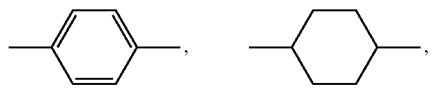

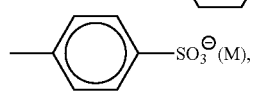

X=halogen, $C_1$- to $C_4$-alkylsulfate (preferably methylsulfate) or $C_1$- to $C_4$-alkanesulfonate and
$R^1$, $R^2$, $R^3$, $R^5$, $R^6$, M and x have the abovementioned meaning, d) from 0.01 to 50 mol % of the components of the formula (IV)

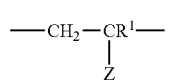 (IV)

where
$Z=\text{—COO}(C_mH_{2m}O)_n\text{—}R^9, \text{—}(CH_2)_p\text{—}O(C_mH_{2m}O)_n\text{—}R^9,$
$R^9=H, C_1\text{-}C_4\text{-alkyl},$

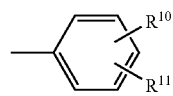

and unsaturated or saturated, linear or branched aliphatic alkyl radical having 20 to 40 C atoms,
$R^{10}=H, C_1\text{-}C_4\text{-alkyl}$, phenyl, benzyl, $C_1\text{-}C_4$-alkoxy, halogen (F, Cl, Br, I), cyano, —COOH, —COOR$^5$, —CO—NH$_2$, —OCOR$^5$,
$R^{11}=$arylalkyl group having $C_1\text{-}C_{12}$-alkyl and $C_6\text{-}C_{14}$-aryl radical,
m=from 2 to 4,
n=from 0 to 200,
p=from 0 to 20, and
$R^1$ and $R^5$ have the abovementioned meaning,
and B) a nonionic polysaccharide derivative selected from the group consisting of methylcellulose, hydroxyethylcellulose, hydroxypropylcellulose, methylhydroxyethylcellulose, methylhydroxypropylcellulose and welan gum or diutan gum, with a weight ratio of A) to B) of from 1:1 to 5:1.

2. The composition as claimed in claim 1, wherein the monovalent or divalent metal cation is selected from the group consisting of sodium, potassium, calcium, magnesium ions, and mixtures thereof.

3. The composition as claimed in claims 1 or 2, wherein the organic amine radicals are substituted ammonium groups which are derived from primary, secondary and tertiary $C_1\text{-}C_{20}$-alkylamines, $C_1\text{-}C_{20}$-alkanolamines, $C_5\text{-}C_8$-cycloalkylamines and $C_6\text{-}C_{14}$-arylamines.

4. The composition as claimed in claim 1 or 2, wherein characterized in that the hydrocarbon or aryl radicals of $R^5$ and $R^6$ are also substituted by hydroxyl, carboxyl or sulfo groups.

5. The composition as claimed in claim 1 or 2, wherein the X in formula (IIIb) is chlorine or bromine.

6. The composition as claimed in claim 1 or 2, wherein the copolymer comprises from 40 to 80 mol % of the component a), from 15 to 55 mol % of the component b), from 2 to 30 mol % of the component c) and from 0.5 to 10 mol % of the component d).

7. The composition as claimed in claim 1 or 2, wherein the copolymer has a number average molecular weight of from 50 000 to 10 000 000.

8. A method of making a water-based paint or aqueous construction system comprising mixing the polymeric composition as claimed in claim 1 with a composition selected from the group consisting of water-based paint product and aqueous construction product based on a hydraulic binder.

9. The method of claim 8, wherein the polymeric composition is effective as a water retention agent, stabilizer or rheology modifier.

10. The method of claim 8 further comprising adding the polymeric composition in an amount of from 0.01 to 5% by weight, based on the dry weight of the construction, paint or coating system.

11. The method of claim 8 wherein the hydraulic binder is selected from the group consisting of cement, lime, gypsum and anhydrite, and mixtures thereof.

* * * * *